United States Patent
Choi et al.

(10) Patent No.: US 8,299,658 B2
(45) Date of Patent: Oct. 30, 2012

(54) HORIZONTAL LINEAR VIBRATOR

(75) Inventors: Jun Kun Choi, Gyunggi-do (KR); Hwa Young Oh, Seoul (KR); Yong Jin Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 45 days.

(21) Appl. No.: 12/805,592

(22) Filed: Aug. 6, 2010

(65) Prior Publication Data

US 2011/0068640 A1   Mar. 24, 2011

(30) Foreign Application Priority Data

Sep. 24, 2009   (KR) .................. 10-2009-0090625

(51) Int. Cl.
*H02K 33/00*   (2006.01)
(52) U.S. Cl. ................ 310/15; 310/17; 310/25
(58) Field of Classification Search .......... 310/15, 310/20, 35–37, 81, 17, 25; 381/433
See application file for complete search history.

(56) References Cited

U.S. PATENT DOCUMENTS

| | | | |
|---|---|---|---|
| 2004/0169425 A1* | 9/2004 | Aihara | 310/15 |
| 2008/0089168 A1* | 4/2008 | Higuchi | 366/116 |

FOREIGN PATENT DOCUMENTS

| | | | |
|---|---|---|---|
| CN | 2662528 | | 12/2004 |
| JP | 8-116658 | | 5/1996 |
| JP | 2002200460 A | * | 7/2002 |
| KR | 10-2007-0103174 | | 10/2007 |
| KR | 1020070103174 | * | 10/2007 |
| KR | 10-2008-0004730 A | | 1/2008 |

OTHER PUBLICATIONS

Machine Translation JP2002200460 (2002).*
Korean Office Action issued Feb. 15, 2011 in corresponding Korean Patent Application 10-2009-0090625.
Chinese Office Action issued Aug. 20, 2012 in corresponding Chinese Patent Application No. 201010251629.5.

* cited by examiner

*Primary Examiner* — Quyen Leung
*Assistant Examiner* — Jose Gonzalez Quinones

(57) ABSTRACT

A horizontal linear vibrator includes: a bracket providing an internal space; a vibration unit mounted in the internal space and making a horizontal, linear movement; a magnetic field unit providing an electromagnetic force to allow the vibration unit to move horizontally; and a cover unit formed to cover an upper portion of the bracket, wherein the bracket includes a support plate part so as to support the vibration unit to make a horizontal, linear movement, and the cover unit is formed to overlap with the support plate part.

11 Claims, 4 Drawing Sheets

HORIZONTAL LINEAR VIBRATOR

CROSS-REFERENCE TO RELATED APPLICATIONS

This application claims the priority of Korean Patent Application No. 10-2009-0090625 filed on Sep. 24, 2009, in the Korean Intellectual Property Office, the disclosure of which is incorporated herein by reference.

BACKGROUND OF THE INVENTION

1. Field of the Invention

The present invention relates to a horizontal linear vibrator and, more particularly, to a horizontal linear vibrator designed to be mounted on a personal mobile terminal to vibrate.

2. Description of the Related Art

In general, one of the key functions requisite for communication devices is a call reception function. Commonly used call reception functions include a sound generating function that generates a melody or a bell sound and a vibration function that transfers vibrations to a device.

Among the functions, the vibration function is commonly used so as not to interfere with others by preventing a melody or a bell sound from being transferred to the exterior through a speaker. In order to implement such vibration function, in generally, a small vibration motor is driven to transfer a driving force to a case of a device to make the device vibrate.

In particular, recently, as mobile terminals have been reduced in size and have improved in quality, the use of a touch screen type display device has been greatly favored, requiring a function of generating vibrations when a touch is applied to the touch screen, so the improvement of the vibration motor has gradually taken place.

A vibration motor applied to mobile phones generates rotatory power in order to rotate a rotational part of unbalance mass, thus obtaining mechanical vibrations, and in this case, rotatory power is generated such that it is mostly subjected to a rectifying action through a brush and a contact point of a commutator to provide current to a rotor coil.

However, in the brush type structure using a commutator, when the motor rotates, the brush passes through the gap between segments of the commutator, generating a mechanical friction and an electrical spark, abrading the brush and the commutator and thereby shortening the life span of the motor.

In addition, because voltage is applied to the motor by using a moment of inertia, time is taken to reach a target amount of vibrations, so it is difficult to implement vibrations suitable for touch screen-employed personal mobile terminals and the like.

SUMMARY OF THE INVENTION

An aspect of the present invention provides a horizontal linear vibrator vibrating in a horizontal lengthwise direction of a personal mobile terminal, and generating a great deal of vibration power.

According to an aspect of the present invention, there is provided a horizontal linear vibrator including: a bracket providing an internal space; a vibration unit mounted in the internal space and making a horizontal, linear movement; a magnetic field unit providing an electromagnetic force to allow the vibration unit to move horizontally; and a cover unit formed to cover an upper portion of the bracket, wherein the bracket includes a support plate part in order to support the vibration unit to make a horizontal, linear movement, and the cover unit is formed to overlap with the support plate part.

The cover unit may have an upper surface in a quadrangular shape, and include side wall parts formed to be bent vertically along four corners.

The cover unit may have an upper surface in a quadrangular shape and include side wall parts formed to be bent vertically along two facing corners.

The bracket may have an insertion part protruded upward, and the cover unit may have a binding recess to bind the insertion part therein.

The vibration unit may include a yoke part accommodating the magnetic field unit therein and a mass body accommodating the yoke part therein.

The yoke part may include an extending portion formed to be tightly attached to an outer surface of the mass body.

The bracket may include a bobbin formed in the internal space, and the magnetic field unit may include a coil part insertedly formed in the bobbin and a magnet disposed to be adjacent to the coil part.

The coil part may have a hollow, and the magnet may be disposed to be insertedly positioned in the hollow.

The coil part may have a quadrangular shape.

The magnet may face both sides of a magnetic body core such that the polarities thereof face each other.

A circuit board may be installed at an upper portion of the bracket and connected with an external input terminal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
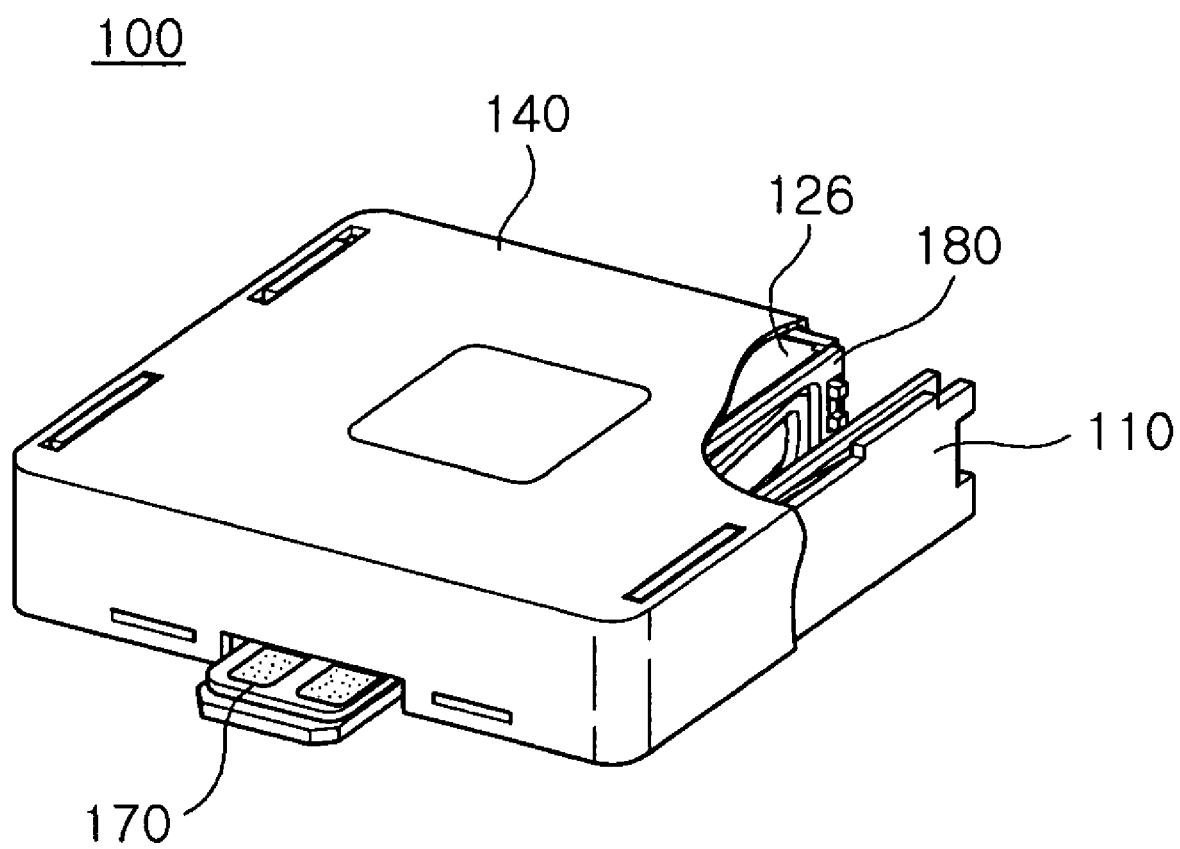
FIG. 1 is a perspective view for explaining a horizontal linear vibrator according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

A horizontal linear vibrator according to exemplary embodiments of the present invention will now be described in detail with reference to FIGS. 1 to 7.

Figure 2:
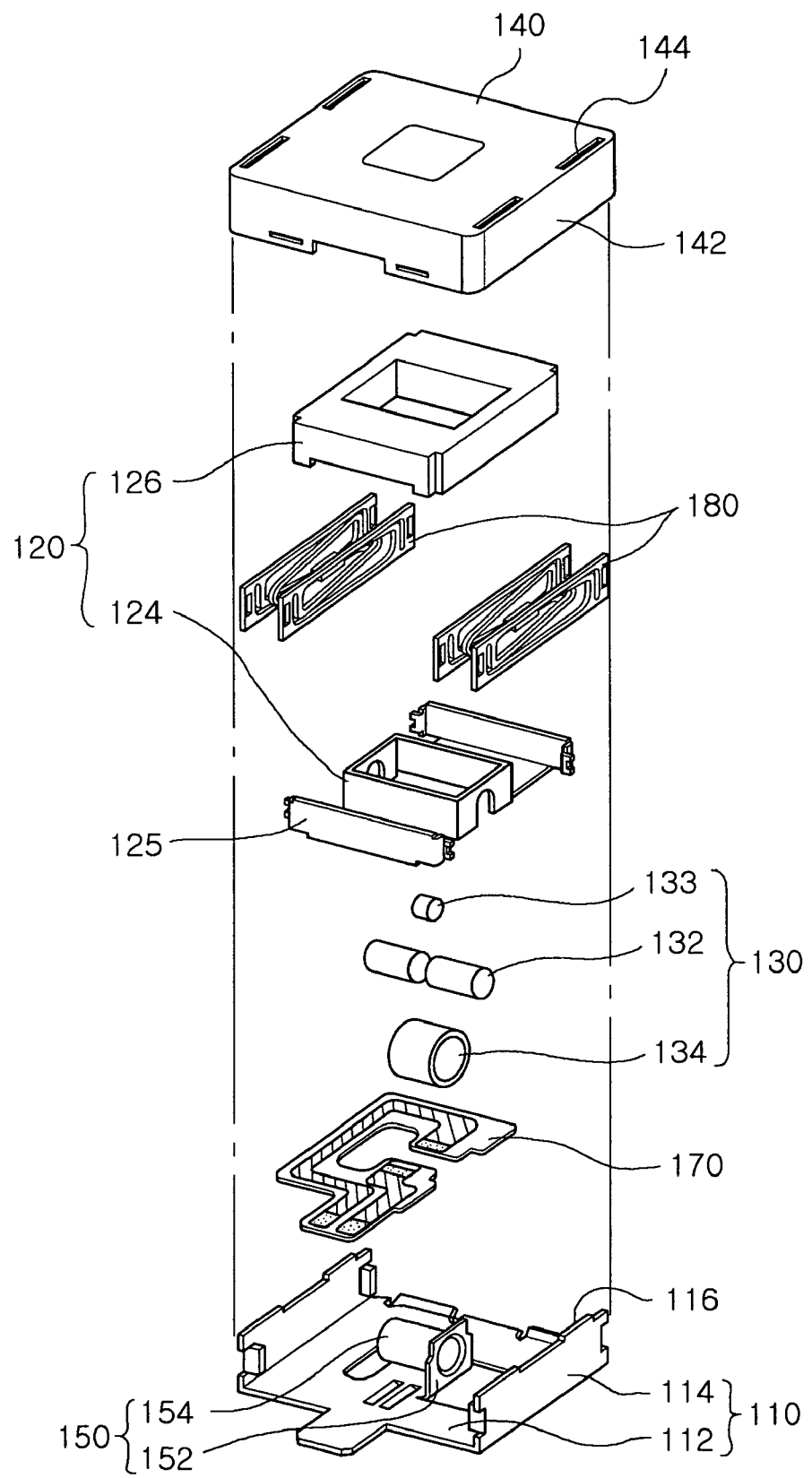
FIG. 2 is an exploded perspective view of the horizontal linear vibrator of FIG. 1.

FIG. 1 is a perspective view for explaining a horizontal linear vibrator according to an exemplary embodiment of the present invention, and FIG. 2 is an exploded perspective view of the horizontal linear vibrator of FIG. 1.

With reference to FIGS. 1 and 2, a horizontal linear vibrator 100 may include a bracket 110, a vibration unit 120, a magnetic field unit 130, and a cover unit 140.

The bracket 110 has a structure in which an upper portion and a lengthwise directional side portion of the bracket 110 are open to correspond to the cover unit 140. Namely, the bracket 110 is formed to have a bracket lower plate 112 and widthwise directional side portions 114 and assembled with the cover unit 140 to form an internal space.

Also, the bracket 110 may include insertion portions 116 protruded upward from the surfaces with which spring members 180 are in contact. Thus, because the insertion portions 116 are bound in binding holes 144 formed on the cover unit 140, the bracket 110 can be stably assembled with the cover unit 140 without being separated, even by an external impact applied thereto.

A bobbin 150 may be formed on an upper portion of the bracket lower plate 112 in order to insertedly fix a cylindrical coil 134, and a circuit board 170 may be mounted at an outer side of the bobbin 150.

The support plates 114 are formed to be bent to be perpendicular to the bracket lower plate 112 to allow spring members 180 to be insertedly fixed to an inner circumferential surface of the support plates 114. Thus, the bracket 110 may be formed such that both end portions thereof are bent vertically, but the shape of the bracket 110 is not limited thereto.

Also, the support plates 114, positioned at both sides of the vibration unit 120, serve to support the vibration unit 120 to vibrate.

The bobbin 150 is positioned at the center of the upper portion of the bracket lower plate 112 and may include a vertical plate part 152 bent to be vertical to the bracket lower plate 112 and a cylindrical part 154 extending from the vertical plate part 152 such that it is horizontal to the bracket lower plate 112.

The vertical plate part 152 and the cylindrical part 154 may have a hollow portion through which a magnet 132 moves reciprocally.

Here, a cylindrical coil 134 is insertedly fixed on an outer circumferential surface of the bobbin 150, and the bobbin 150 has the cylindrical shape with a hollow portion therein allowing the magnet 132 to make a reciprocal movement therethrough. However, the structure of the bobbin 150 is not limited thereto, and the structure may be omitted.

The circuit board 170 is connected with an external input terminal and transfers power applied thereto to the cylindrical coil 134. The circuit board 170 may include a pattern part formed on its upper surface and an opening part formed therein to allow the bobbin 150 to pass therethrough.

However, the circuit board 170 is not limited to the configuration in which it is formed separately from the bracket 110. Namely, the circuit board 170 and the bracket 110 may be integrally formed according to a designer's intention.

The coil part may include the cylindrical coil 134. The cylindrical coil 134 serves to generate an electric field of a certain strength when power is applied thereto from an external source. The cylindrical coil 134 may be inserted onto the outer circumferential surface of the cylindrical part 154 of the bobbin 150.

A coil line of the cylindrical coil 134 is connected with the pattern part of the circuit board 170 through soldering, whereby power can be applied to the cylindrical coil 134 from an external source.

However, the coil part is not limited to the cylindrical shape. Namely, a rectangular coil may be disposed on the upper surface of the bracket 110, or a plate may be formed and disposed thereon.

The vibration unit 120 includes a yoke part 124 accommodating both the cylindrical coil 134 and the magnet 132 therein, and a mass body 126 accommodating the magnet 132 and the yoke part 124. The vibration unit 120 moves in a horizontal vibration direction by an interaction of the magnet 132 and the cylindrical coil 134.

The magnetic field unit 130 includes the cylindrical coil 132 accommodated in the bobbin 150 and the magnet 132 disposed to be adjacent to the cylindrical coil 134.

A vibration direction of the vibration unit 120 is determined according to the Lorentz Force by an electric force of the frequency generated from the cylindrical coil 134 and the direction of a magnetic field generated toward the yoke part 124 from the magnet 132.

The magnet 132 serves to force the vibration unit to move linearly according to its interaction with the cylindrical coil 134 by generating a magnetic field of a certain strength. The magnets 132 are attached to both sides of a magnetic core 133.

Here, the magnets 132 attached to both sides of the magnetic core 133 may be disposed such that the same polarities thereof face each other.

In this case, a magnetic fluid may be coated on an outer circumferential surface of the magnet 132 in order to prevent the magnet 132 from being directly brought into contact with an inner circumferential surface of the cylindrical part 154 of the bobbin 150 when the mass body 126 vibrates horizontally.

Here, the magnetic fluid is obtained by stably dispersing magnetic powder in a colloid shape in a liquid and then adding a surfactant thereto to prevent the magnetic powder from being precipitated or coagulated due to gravitation or a magnetic field. For example, the magnetic fluid may include a magnetic fluid obtained by dispersing triiron tetroxide or iron-cobalt alloy molecules in oil or water and, recently, a magnetic fluid obtained by dispersing cobalt in toluene.

The magnetic powder is ultrafine particles having a size of 0.01 μm to 0.02 μm, has Brownian motion peculiar to ultrafine particles, and has the characteristics that the concentration of the magnetic powder particles in the fluid is uniformly maintained even when an external magnetic field, gravitation, centrifugal force, etc., is applied thereto.

The yoke part 124 serves to self-close a circuit to smoothly form a magnetic flux of the magnet 132. The yoke part 124 may have an internal space in which the cylindrical coil 134 and the magnet 132 are accommodated.

The yoke part 124 may include extending parts 125 formed by bending both ends thereof such that they are positioned to be perpendicular to the bracket lower plate 112. The extending parts 125 are tightly attached to the outer sides of the mass body 126.

The mass body 126 serves to apply a certain mass to the vibration unit 120 for linear vibrations, and includes an accommodation space to accommodate the central portion of the yoke part 124 therein. Thus, the mass body 126 accommodates the yoke part 124 accommodating the magnet 132 in its accommodating space, and the extending parts 125 bent from the yoke part 124 are in contact with the outer sides of the mass body 126.

The mass body 126 may have a mass of a certain size and vibrates horizontally in a vibration direction according to an interaction of the magnet 132 and the cylindrical coil 134. Here, the vibration direction refers to a direction horizontal to the cylindrical coil 134.

The spring members 180 serve to elastically support the vibration unit 120 to move in a horizontally in a linear direction. In a state in which one side of the spring members 180 is fixed to the widthwise directional side portions 114, the other side of the spring member 180 is fixed to the vibration unit 120, thus elastically supporting the vibration unit 120.

Here, the spring members 180 are provided as pairs in corresponding positions at both sides of the vibration unit 120, and disposed at an upper portion of the bracket 110. The spring member 180 may be, for example, a coil spring, a leaf spring, or the like.

In this manner, because the horizontal linear vibrator according to the present exemplary embodiment vibrates in a horizontal direction, namely, in a lengthwise direction, rather than in a thicknesswise direction, of the personal mobile terminal, the personal mobile terminal can become slimmer. Also, because the horizontal linear vibrator is formed to be lengthy along the lengthwise direction of the personal mobile terminal, a movement displacement of the vibration unit can be secured to thus improve the vibration performance.

The cover unit 140 is formed to cover the upper portion of the bracket 110 and includes side wall parts 142 formed to overlap with the support plates 114 of the bracket 110 in contact with the spring members 180 to thereby prevent the support plates 114 of the bracket 110 from being shaken when the vibration unit 120 moves.

An upper surface of the cover unit 140 has a quadrangular shape, and the side wall parts 142 may be bent vertically along four corners. However, the side wall parts 142 may not be limited to the shape thereof. Namely, the side wall parts 142 may be bent vertically only along two facing corners.

The cover unit 140 may include binding holes 144 formed in a slit shape on the upper surface thereof. The insertion portions 116 as mentioned above are inserted into the binding holes 144, thereby stably binding the cover unit 140 and the bracket 110.

Figure 3:
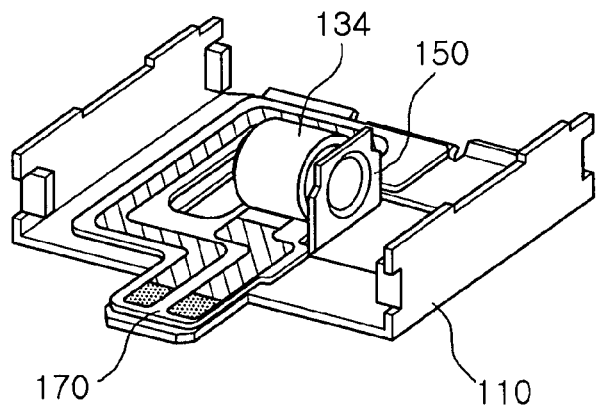
FIGS. 3 to 5 are perspective views for explaining the process of assembling the horizontal linear vibrator according to an exemplary embodiment of the present invention.
Figure 4:
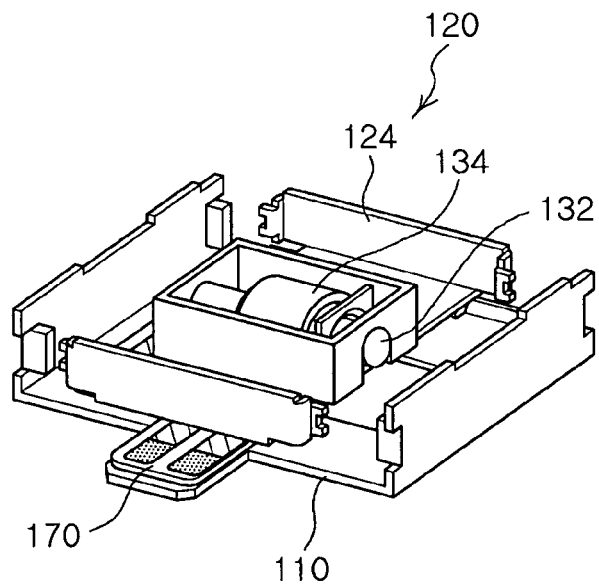
Figure 5:
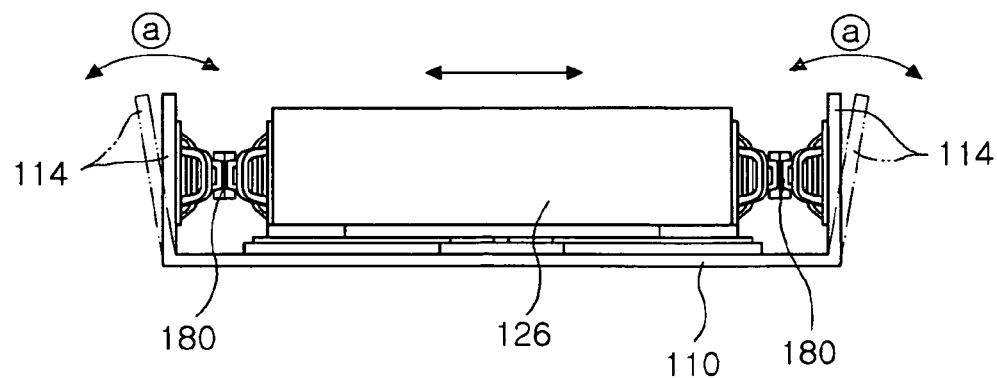

FIGS. 3 to 5 are perspective views for explaining the process of assembling the horizontal linear vibrator according to an exemplary embodiment of the present invention.

As shown in FIGS. 3 and 4, the circuit board 170 is attached to the upper portion of the bracket 110. Here, the circuit board 170 is connected with an external input terminal to transfer power applied thereto to the cylindrical coil 134.

The cylindrical coil 134 may be disposed to surround the bobbin 150, and, according to this configuration, an empty space may be provided at the center of the bobbin 150 and the cylindrical coil 134, and the magnet 132 may be mounted in the empty space.

The magnet 132 may be insertedly fixed in the hollow of the bobbin 150 and the cylindrical coil 134, and the vibration unit 120 vibrates in a vibration direction according to an interaction of the magnet 132 and the cylindrical coil 134. Here, the vibration direction refers to a direction horizontal to the cylindrical coil 134.

After the magnet is insertedly positioned in the hollow of the cylindrical coil 134, the yoke 124 is disposed in the interior of the bracket 110 so that the magnet 132 and the cylindrical coil 134 can be accommodated therein.

As shown in FIG. 5, the mass body 126 is disposed such that the yoke part 124 is accommodated therein, and the spring members 180 are inserted at both sides of the mass body 126.

In this case, when the vibration unit 120 vibrates according to an interaction of the magnet 132 and the cylindrical coil 134, the support plates 114 of the bracket 110 are naturally shaken (□). Such shaking of the bracket 110 may cause degradation of the vibration power of the vibrating unit 120.

Figure 6:
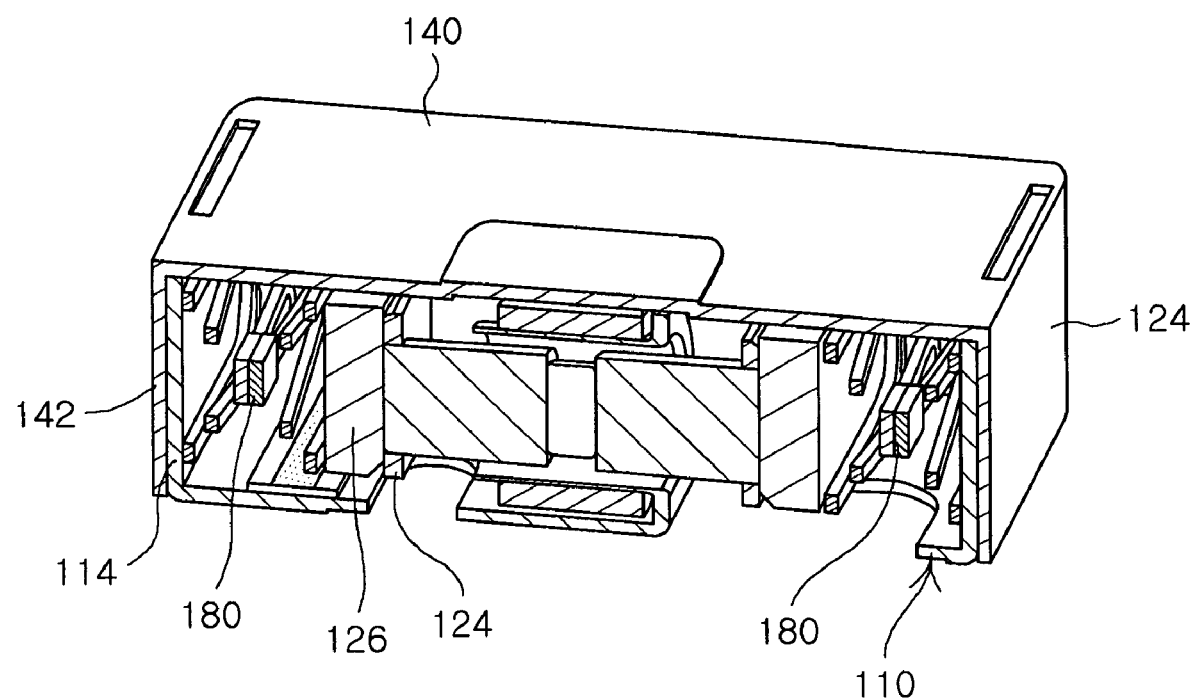
FIG. 6 is a cross-sectional view illustrating the effect of the horizontal linear vibrator according to an exemplary embodiment of the present invention.

FIG. 6 is a cross-sectional view for illustrating the effect of the horizontal linear vibrator according to an exemplary embodiment of the present invention.

With reference to FIG. 6, the mass body 126 is disposed such that the yoke part 124 is accommodated therein, the spring members 180 are inserted at both sides of the mass body 126, and the cover unit 140 is then assembled so as to cover the outer side.

Accordingly, the side wall parts 142 of the cover unit 140 are in contact with the outer sides of the support plates 114 of the bracket 110, as shown in FIG. 5, the support plates 114 of the bracket 110 potentially generated when the mass body 126 vibrates can be prevented from being shaken by the side wall parts 142 of the cover unit 140, thus improving the vibration power of the vibration unit 120.

In this case, because the spring members 180 are bound to move according to the shaking of the support plates 114 of the bracket 110, the movement of the spring members 180 may increase to lead to a reduction in the life span of the spring members 180. However, in the present exemplary embodiment, because the shaking of the outer surfaces of the bracket 110 is prevented, the life span of the spring members can thereby be lengthened.

Also, because the cover unit 140 and the bracket 110 have a stronger rigidity owing to the presence of the side wall parts 142, they can protect the interior against an external impact, and thus, reliability can be obtained even in the occurrence of its dropping.

Figure 7:
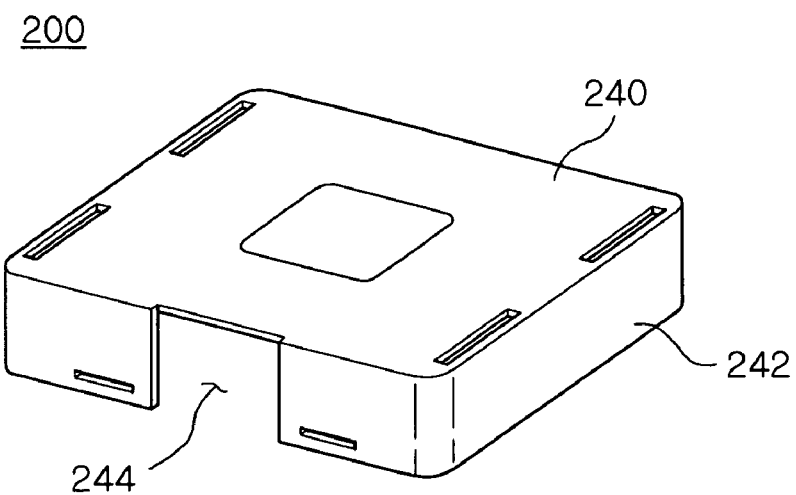
FIG. 7 is a cross-sectional view illustrating a cover unit of a horizontal linear vibrator according to another exemplary embodiment of the present invention.

FIG. 7 is a cross-sectional view illustrating a cover unit of a horizontal linear vibrator according to another exemplary embodiment of the present invention.

With reference to FIG. 7, a horizontal linear vibrator 200 may include a bracket, a vibration unit, a spring member, and a cover unit 240.

The bracket, the vibration unit, and the spring member according to the present exemplary embodiment may have substantially the same configuration as those of the former exemplary embodiment, so a detailed description and illustration thereof will be omitted.

The cover unit 240 is formed to cover an upper portion of the bracket 110, and includes side wall parts 242 formed on an outer surface of the bracket 110 in contact with the spring member 180 to thereby prevent the outer surface of the bracket 110 from being shaken when the vibration unit 120 moves.

In this case, the side wall parts 242 are formed to be bent vertically along four corners of the upper surface of the cover unit 240 and may have a partial cutout portion 244.

Because the rigidity of the cover unit 240 and the outer surface of the bracket increases by the presence of the side wall parts 242, the interior can be protected against an external impact, and thus, reliability can be obtained even in the occurrence of its dropping.

As set forth above, according to exemplary embodiments of the invention, because the horizontal linear vibrator vibrates in a horizontal direction, namely, in a lengthwise direction, rather than in a thicknesswise direction, of the personal mobile terminal, the personal mobile terminal can become slimmer. Also, because a large movement displacement of the vibration unit is secured along the lengthwise direction of the personal mobile terminal, the vibration performance can be improved.

In addition, because the cover unit of the horizontal linear vibrator includes the side wall part formed in an overlapping manner at the support plate part of the bracket in contact with the spring member, the support plate part of the bracket is prevented from being shaken when the vibration unit moves.

Thus, the bracket can be prevented from being deformed to thus realize high vibration power.

While the present invention has been shown and described in connection with the exemplary embodiments, it will be apparent to those skilled in the art that modifications and variations can be made without departing from the spirit and scope of the invention as defined by the appended claims.

What is claimed is:

1. A horizontal linear vibrator comprising:
a bracket providing an internal space;
a vibration unit mounted in the internal space and making a horizontal, linear movement;
a magnetic field unit providing an electromagnetic force to allow the vibration unit to move horizontally; and
a cover unit formed to cover an upper portion of the bracket,
wherein the bracket comprises a support plate part in contact with the vibration unit when the vibration unit makes a horizontal, linear motion, and the cover unit comprises side wall parts which overlap the support plate part after the cover unit is coupled to the bracket.

2. The horizontal linear vibrator of claim 1, wherein the cover unit has an upper surface in a quadrangular shape, and comprises the side wall parts formed to be bent vertically along four corners.

3. The horizontal linear vibrator of claim 1, wherein the cover unit has an upper surface in a quadrangular shape and comprises the side wall parts formed to be bent vertically along two facing corners.

4. The horizontal linear vibrator of claim 1, wherein the bracket comprises an insertion part protruded upward, and the cover unit comprises a binding recess to bind the insertion part therein.

5. The horizontal linear vibrator of claim 1, wherein the vibration unit comprises a yoke part accommodating the magnetic field unit therein and a mass body accommodating the yoke part therein.

6. The horizontal linear vibrator of claim 5, wherein the yoke part comprises an extending portion formed to be tightly attached to an outer surface of the mass body.

7. The horizontal linear vibrator of claim 1, wherein the bracket comprises a bobbin formed in the internal space, and the magnetic field unit comprises a coil part insertedly formed in the bobbin and a magnet disposed to be adjacent to the coil part.

8. The horizontal linear vibrator of claim 7, wherein the coil part comprises a hollow, and the magnet is disposed to be insertedly positioned in the hollow.

9. The horizontal linear vibrator of claim 7, wherein the coil part has a quadrangular shape.

10. The horizontal linear vibrator of claim 7, wherein the magnet faces both sides of a magnetic body core such that the polarities thereof face each other.

11. The horizontal linear vibrator of claim 1, wherein a circuit board is installed at an upper portion of the bracket and connected with an external input terminal.

* * * * *